US009002053B2

(12) United States Patent
Malhas et al.

(10) Patent No.: US 9,002,053 B2
(45) Date of Patent: Apr. 7, 2015

(54) IRIS RECOGNITION SYSTEMS

(71) Applicants: Imad Malhas, Amman (JO); Alan Renforth, Malvern (GB)

(72) Inventors: Imad Malhas, Amman (JO); Alan Renforth, Malvern (GB)

(73) Assignee: IrisGuard Inc., Amman (JO)

( * ) Notice: Subject to any disclaimer, the term of this patent is extended or adjusted under 35 U.S.C. 154(b) by 166 days.

(21) Appl. No.: 13/646,410

(22) Filed: Oct. 5, 2012

(65) Prior Publication Data
US 2013/0089236 A1 Apr. 11, 2013

(30) Foreign Application Priority Data

Oct. 7, 2011 (GB) .................................. 1117346.5

(51) Int. Cl.
*G06K 9/00* (2006.01)
*G06K 9/20* (2006.01)

(52) U.S. Cl.
CPC .......... *G06K 9/00604* (2013.01); *G06K 9/2027* (2013.01); *G06K 9/2036* (2013.01)

(58) Field of Classification Search
None
See application file for complete search history.

(56) References Cited

U.S. PATENT DOCUMENTS

| | | | |
|---|---|---|---|
| 4,641,349 A | | 2/1987 | Flom et al. |
| 5,283,598 A | | 2/1994 | McMillan et al. |
| 5,291,560 A | | 3/1994 | Daugman |
| 5,608,489 A | * | 3/1997 | Ozaki .............................. 396/51 |
| 5,696,998 A | * | 12/1997 | Yamada et al. ................... 396/51 |
| 5,801,763 A | * | 9/1998 | Suzuki ............................. 348/77 |
| 5,901,238 A | | 5/1999 | Matsushita |
| 5,933,502 A | | 8/1999 | Aucsmith et al. |
| 6,120,461 A | | 9/2000 | Smyth |
| 6,315,194 B1 | | 11/2001 | Graef et al. |
| 6,332,193 B1 | | 12/2001 | Glass et al. |
| 7,574,270 B2 | | 8/2009 | Takahashi et al. |
| 7,660,437 B2 | * | 2/2010 | Breed ............................ 382/104 |
| 7,796,784 B2 | | 9/2010 | Kondo et al. |
| 8,028,896 B2 | | 10/2011 | Carter et al. |
| 8,397,988 B1 | | 3/2013 | Zuili |

(Continued)

FOREIGN PATENT DOCUMENTS

DE 20 2007 005 012 U1 6/2007
EP 1 452 127 9/2004

(Continued)

OTHER PUBLICATIONS

Daugman, J., "How Iris Recognition Works," *IEEE Transactions on Circuits and Systems for Video Technology*, Jan. 2004, pp. 21-30, vol. 14, No. 1.

(Continued)

*Primary Examiner* — Avinash J Yentrapati
(74) *Attorney, Agent, or Firm* — Fenwick & West LLP

(57) ABSTRACT

The present invention concerns a method for capturing an image of an iris free of specularities from a spectacle-wearing user for use in an iris recognition identification system, which includes an illumination source and an image capture device. The method comprises illuminating the user's eye from a first illumination position associated with a first optical path, and capturing a first image of the eye; and determining if the first image comprises a specular image in a first region of interest, the specular image being formed by light reflected from the spectacles. If a specular image is present, the method further comprises illuminating the eye from a second illumination position associated with a second optical path different to the first optical path, such that the specular image is shifted to a second region; and capturing a second image of the eye.

42 Claims, 6 Drawing Sheets

Direct illumination mode of operation    Crossed Illumination mode of operation

(56) References Cited

U.S. PATENT DOCUMENTS

| | | | |
|---|---|---|---|
| 8,423,453 | B1 | 4/2013 | Elliott |
| 8,509,473 | B2* | 8/2013 | Wagner ........................ 382/100 |
| 2002/0181774 | A1* | 12/2002 | Ishikura ....................... 382/190 |
| 2003/0012413 | A1 | 1/2003 | Kusakari et al. |
| 2003/0152251 | A1* | 8/2003 | Ike ............................... 382/117 |
| 2004/0037450 | A1 | 2/2004 | Bradski |
| 2005/0270483 | A1* | 12/2005 | Fujimatsu et al. ............ 351/206 |
| 2006/0087582 | A1* | 4/2006 | Scharenbroch et al. ...... 348/370 |
| 2007/0110285 | A1 | 5/2007 | Hanna et al. |
| 2007/0274571 | A1 | 11/2007 | Hamza |
| 2008/0084499 | A1* | 4/2008 | Kisacanin et al. ............ 348/370 |
| 2008/0156872 | A1 | 7/2008 | Register et al. |
| 2009/0046249 | A1* | 2/2009 | Northcott et al. ............. 351/208 |
| 2009/0237208 | A1* | 9/2009 | Tsukahara et al. ........... 340/5.82 |
| 2009/0282258 | A1 | 11/2009 | Burke et al. |
| 2009/0289112 | A1 | 11/2009 | Bonalle et al. |
| 2009/0304232 | A1 | 12/2009 | Tsukizawa |
| 2010/0161488 | A1 | 6/2010 | Evans et al. |
| 2010/0195049 | A1 | 8/2010 | Stark et al. |
| 2012/0170027 | A1* | 7/2012 | Tsukizawa et al. ........... 356/124 |
| 2013/0089240 | A1* | 4/2013 | Northcott et al. ............. 382/117 |
| 2013/0148111 | A1* | 6/2013 | Hanssen et al. ............... 356/124 |

FOREIGN PATENT DOCUMENTS

| | | |
|---|---|---|
| EP | 1 911 393 A2 | 4/2008 |
| JP | 2003-006628 | 1/2003 |
| JP | 2004-164483 | 6/2004 |
| WO | WO 86/05018 | 8/1986 |
| WO | WO 94/09446 A1 | 4/1994 |
| WO | WO 98/08439 | 3/1998 |
| WO | WO 99/27844 | 6/1999 |
| WO | WO 99/38121 | 7/1999 |
| WO | WO 02/087442 A1 | 11/2002 |
| WO | WO 2010/099475 A1 | 9/2010 |

OTHER PUBLICATIONS

Daugman, J., "The importance of being random: statistical principles of iris recognition," *Pattern Recognition*, 2003, pp. 279-291, vol. 36.

Hecht, E., "Optics," © Pearson Education Inc., publishing as Addison Wesley, ISBN 0-321-18878-0, Chapter 4, 2002, pp. 112-122.

LG Electronics U.S.A., Inc., "Iris Access—Advanced Identity Authentication," Technical Specifications, 2009, two pages.

United Kingdom Intellectual Property Office, Search Report, Patent Application No. GB1117346.5, Jun. 6, 2012, two pages.

Huang, W. et al., "A New AutoFocus Method Used in Portable Iris Image Acquisition System," *3rd International Congress on Image and Signal Processing*, 2010, pp. 2008-2011.

United Kingdom Intellectual Property Office, Search Report, Patent Application No. GB 1121411.1, Apr. 11, 2012, three pages.

United Kingdom Intellectual Property Office, Search Report, Patent Application No. GB 1117348.1, Jan. 16, 2012, three pages.

United Kingdom Intellectual Property Office, Search Report, Patent Application No. GB 1117356.4, Jan. 24, 2012, three pages.

* cited by examiner

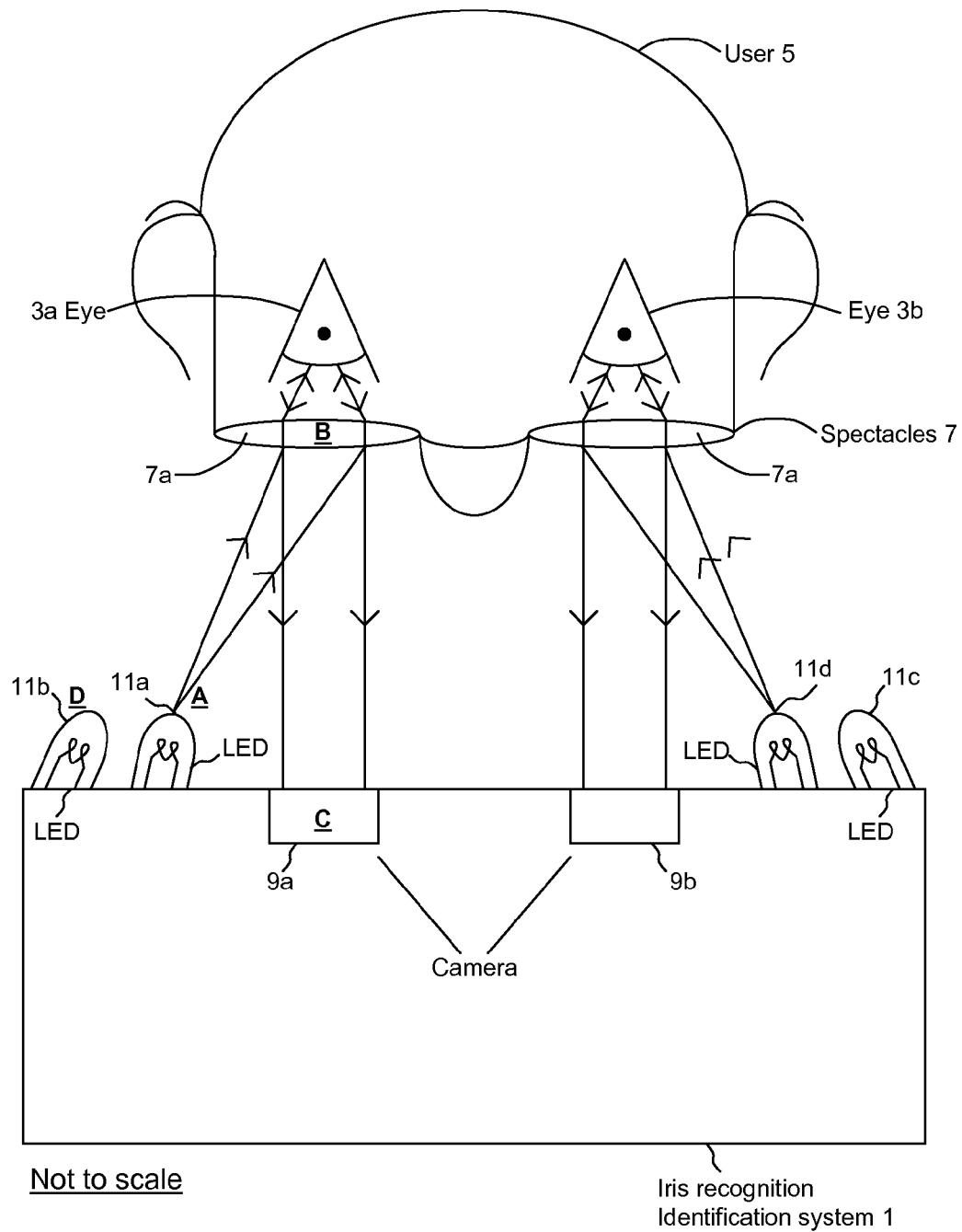
Fig 1a: Direct illumination mode of operation

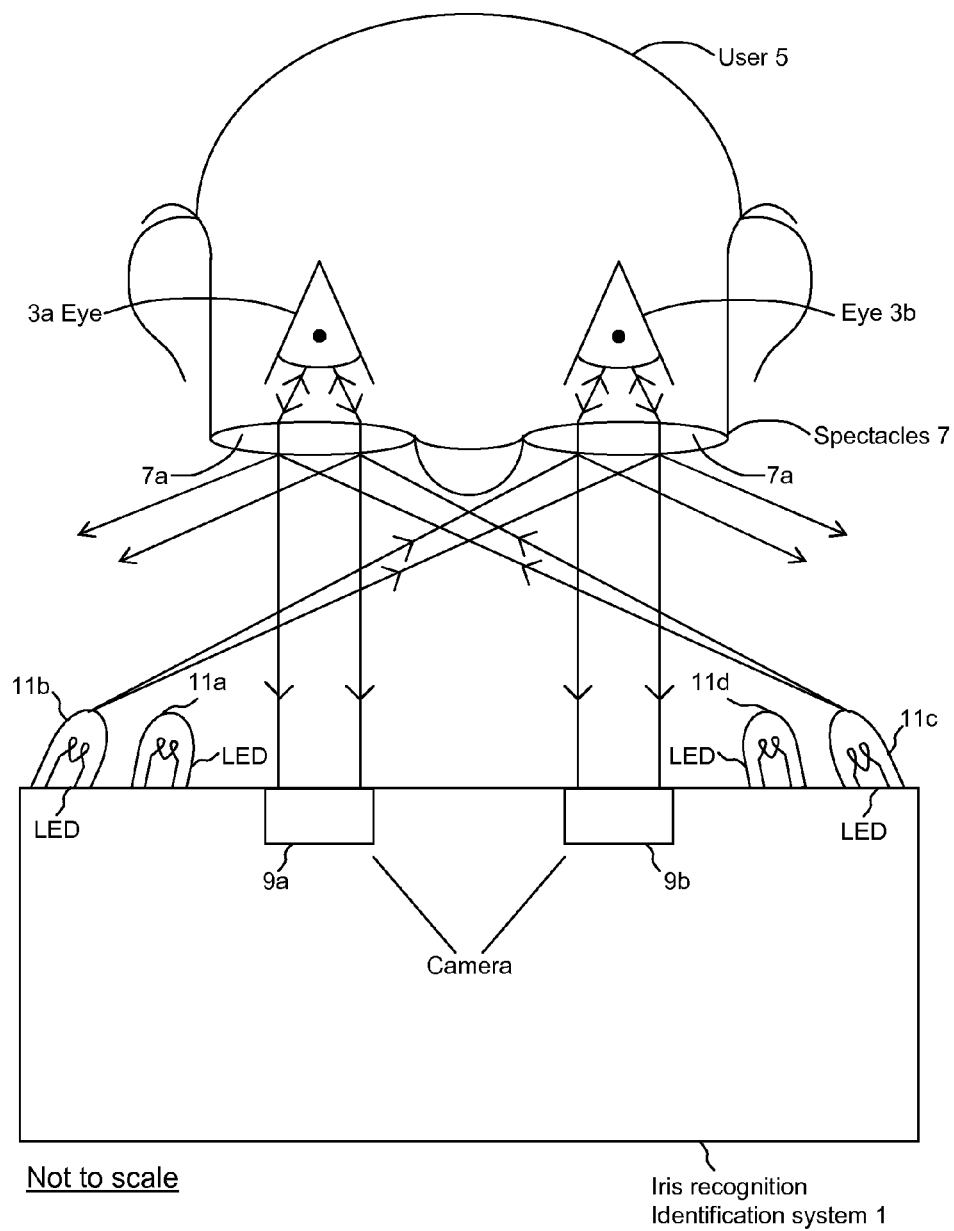
Fig 1b: Crossed illumination mode of operation

Perspective view (not to scale)

Side view of Face A (not to scale)

IRIS RECOGNITION SYSTEMS

CROSS REFERENCE TO RELATED APPLICATIONS

This application claims the right of priority under 35 U.S.C. §119 to GB application serial no. 1117346.5, filed Oct. 7, 2011, which is incorporated by reference in its entirety.

FIELD

The present invention concerns improvements for iris recognitions systems, and more specifically to methods and apparatus for capturing clear images of a spectacle wearing user's iris.

BACKGROUND

The use of biometric identification systems is becoming ever more widespread for uniquely identifying people. The majority of known biometric identification systems use one or more intrinsic physical characteristics of a person for identification purposes. The accuracy of a biometric identification system is dependent on the uniqueness of the selected physical characteristic.

The iris is an example of a unique physical characteristic suitable for use in biometric identification systems. Such biometric identification systems generically referred to as iris recognition technology, have become increasingly popular. One advantage of this technology over other known biometric technologies is that iris recognition technology has the smallest outlier (those user's who cannot use the system) group of all known biometric technologies. For this reason it is considered to be the most suitable biometric identification technology for mass use. Furthermore, due to the speed of comparison of iris recognition identification systems, it is the only known biometric technology well-suited for one-to-many identification.

Known iris recognition identification systems use pattern-recognition techniques to uniquely identify an iris pattern from a captured image of the irides of an individual's eyes. U.S. Pat. No. 5,291,560 discloses an example of a known iris recognition identification system, and describes in detail how such systems work. The article "How Iris Recognition Works", published in IEEE Transactions on Circuits and Systems for Video Technology, Vol. 14, No. 1, January 2004, authored by John Daugman, who is incidentally the inventor of the afore cited patent, provides a discussion of the underlying principles explaining how iris recognition identification systems work.

In order for iris recognition identification systems to provide accurate identification verification results, a clear and sufficiently high resolution image of the iris and/or irides must be captured, wherefrom the required iris pattern detail may be determined. Unclear images or low resolution images of the iris and/or irides can increase the rate of false negative verification results.

The formation of undesired "optical artifacts" in the captured image of the iris is often a cause for unclear images. Such optical artifacts may relate, for example to specular images and/or reflections (i.e. specularities) formed in the image plane and captured by the iris recognition identification system. When such specularities are present in the iris region of the captured image, this decreases the clarity of the iris image and as a result may increase the rate of false negative verification results.

One source of such undesired optical artifacts is reflective surfaces, such as the optical lenses of spectacles (i.e. eyeglasses, sunglasses or any other form of optical lenses worn on the nose and ears to cover the eyes). Capturing a clear image of an iris from a spectacle-wearing user is a problem for known iris recognition identification systems. One way in which this problem may be understood is to consider light illuminating a spectacle-wearing user's eye. A portion of the incident light is reflected by the spectacles, whilst the majority of the incident light is reflected by the eye (for present purposes we will ignore any absorption of the incident light occurring in either the spectacles or in the tissue of the human eye). Both portions of reflected light are subsequently captured and imaged by an image capture device, such as a camera. The captured image comprises an image of the eye, with an image of the spectacles and/or specular image superimposed on the iris region of the captured image of the eye. This superimposed image of the spectacles and/or specular image decreases the clarity of the iris portion of the captured image, and can have the undesired effect of increasing the rate of false negative verification results generated by iris recognition identification systems.

Currently known iris recognition identification systems require that the user remove their spectacles prior to image capture, to ensure that a clear image of iris may be captured. However, in many applications this solution is unsatisfactory, in particular in un-manned applications. Un-manned applications relate to applications of iris recognition identification systems where the process of iris image capture and iris verification is carried out in the absence of any operator. In manned applications an operator is present instructing the user how to position themselves, and to remove any spectacles such that a clear image of the iris may be captured. In contrast, in un-manned applications there is no operator present to assist the user.

It is an object of un-manned iris identification recognition systems to minimise the required active involvement of the user, and to simplify the image capture process. In this way, user-induced errors in the image capture process may be minimised.

It is an object of the present invention to provide a solution to the problem of undesired optical artifacts arising from a spectacle-wearing user, which solution minimises active user participation, to thereby improve the fidelity and usability of iris identification recognition systems in un-manned applications.

SUMMARY

A first aspect of the invention concerns a method of capturing an image of an iris free of specularities from a spectacle-wearing user in an iris recognition identification system, which includes an illumination source and an image capture device. The method comprises: illuminating the user's eye from a first illumination position associated with a first optical path, and capturing a first image of the eye; determining if the first image comprises a specular image in a first region of interest, the specular image being formed by light reflected from the spectacles. If a specular image is present, the method further comprises illuminating the eye from a second illumination position associated with a second optical path different to the first optical path, such that the specular image is shifted to a second region; and capturing a second image of the eye.

Preferably, the first region of interest comprises an image of the iris, and the determining step comprises analysing the iris image to identify if the location of the specular image is at least partly coincident with the iris image. In this way the specular image is shifted away from the first region of interest to a second region, enabling a clear image of the iris to be captured for subsequent use in carrying out biometric identification, without requiring the user remove the spectacles.

In some embodiments, the second region may be comprised in the second image, and may comprise an image of the sclera of the eye. In such embodiments the specular image may be shifted to the sclera enabling a clear, specularity free image of the iris to be captured.

Alternatively, the second region may comprise an image of the pupil of the eye, and the specular image is shifted to the pupil, thereby enabling a clear image of the iris to be captured.

The image capture device comprises an image capture plane within which the second image is formed, and in preferred embodiments the second region is located in a plane incongruent with the image capture plane, such that the second image is free of specularities. In such preferred embodiments the specular image is not captured by the image capture device, enabling a specularity clear image of the entire eye to be captured, comprising the iris, pupil and sclera.

Alternative embodiments may comprise the step of switching from the first illumination position to the second illumination position by varying the optical path between the illumination source and the user's eye, and/or varying the optical path between the user's eye and the image capture device. By varying either optical path, the position of the specular image may be shifted away from the region of interest—in other words, away from the iris image.

Similarly, alternative embodiments may comprise varying the relative position of the illumination source with respect to the user's eye such that the optical path between the illumination source and the user's eye is varied. This may be achieved by moving either the illumination source with respect to the user's eye, or the user's eye with respect to the illumination source. Varying the position of either, changes the optical path, which shifts the position of the specular image.

Alternatively, the relative position of the image capture device may be varied with respect to the user's eye, such that the optical path between the image capture device and the user's eye is varied, to achieve the desired result of shifting the position of the specular image.

Preferably, the illumination source comprises a plurality of light sources located at different positions with respect to the user's eye, and the optical path is varied by activating a different one of the plurality of light sources. Such embodiments are advantageous in that no moving parts are required to effect the desired optical path variance to shift the specular image away from the region of interest.

In such embodiments, each one of the light sources may be associated with either the first illumination position or with the second illumination position, and the optical path is varied in the illuminating step by activating a light source associated with the second illumination position.

Each one of the light sources may be mounted on an angled support block. The block may comprise: a first support surface comprising one or more light sources associated with the first illumination position; and a second support surface comprising one or more light sources associated with the second illumination position. The block may be arranged such that light emitted from a light source comprised on the first support surface forms an acute angle with light emitted from a light source comprised on the second surface. Mounting the light sources on the angled support blocks enables the desired angles of incidence associated with respectively the first and second illumination positions to be achieved.

Alternatively, the illumination source may comprise a position-variable light source, and the varying step comprises varying the position of the light source from the first illumination position to the second illumination position. In such embodiments a single movable light source may be used to obtain the desired effect of shifting the position of the specular image away from the region of interest.

Alternatively, the optical path may be varied by varying the position of the user with respect to the illumination source or the image capture device.

Alternatively, the optical path may be varied by varying the position of the image capture device with respect to the user's eye or the illumination source.

The user's spectacle comprises an optical lens comprising a lens surface, and light emitted during the illuminating steps from the illumination source is incident on the lens at an angle of incidence. Accordingly, by shifting the position of the illumination source, or in other words by varying the optical path of emitted light, the angle of incidence may be varied.

In preferred embodiments, the angle of incidence of light emitted from the illumination source associated with the first illumination position is acute. By acute is intended any angle less than 90°.

Alternatively, the angle of incidence associated with light emitted from a light source associated with the first illumination position is substantially normal to the lens surface. In other words, in alternative embodiments the angle of incidence may be substantially at a right angle (i.e. 90°) to the lens surface.

Alternatively, the angle of incidence $\theta$ associated with light emitted from a light source associated with the first illumination position, may be comprised within the range $0° \leq \theta \leq 20°$ measured with respect to a normal to the lens surface.

Alternatively, the angle of incidence associated with light emitted from a light source associated with the first illumination position may be substantially 12° measured with respect to the normal to the lens surface.

Similarly, the angle of incidence associated with light emitted from a light source associated with the second illumination position is preferably acute. In this instance, acute is used to mean less than 90°.

Alternatively, the angle of incidence $\theta$ associated with light emitted from a light source associated with the second illumination position, may be comprised within the range $21° \leq \theta \leq 40°$ measured with respect to a normal to the lens surface.

Alternatively, the angle of incidence associated with light emitted from a light source associated with the second illumination position may be substantially 22° measured with respect to the normal to the lens surface.

A second aspect of the present invention concerns an iris recognition identification system suitable for capturing an image of an iris free from specularities from a spectacle-wearing user. The system comprises: an image capture device for capturing one or more images of the spectacle-wearing user's eye; first illumination means for illuminating the spectacle-wearing user's eye from a first illumination position associated with a first optical path; determining means for determining if a first captured image illuminated from the first illumination position, comprises a specular image located in a first region of interest, the specular image being formed by light reflected from the spectacles; second illumination means for illuminating the spectacle-wearing user's eye from a second illumination position; and wherein the second illumination position is associated with a second optical path different to the first optical path such that the location of the specular image is shifted to a second region when the second illumination means is active. The presence of the second illumination means associated with a second optical path, enables the position of the specular image to be shifted away from the region of interest, such that a clear image of the spectacle-wearing user's eye may be captured without requiring the user remove the spectacles.

Preferably, the determining means comprises a processor configured with image analysis software for analysing the first captured image to determine if the position of the specular image is at least partly coincident with the first region of interest.

Preferably, the first region of interest comprises the image of the iris, and the processor is configured to determine if the position of the specular image is at least partly coincident with the iris image from the analysis of the first image. In this way the system is able to identify the presence of a specular image in the first image, which indicates that the user is wearing spectacles. On this basis, the illumination position may be varied to enable a clear image of the user's iris to be captured for subsequent biometric identification purposes.

The image capture device comprises an image capture plane, and preferably the image capture device is arranged to capture a second image of the spectacle-wearing user's eye when the eye is illuminated from the second illumination position. In this way a clear image of the iris is captured.

In preferred embodiments, the second region is comprised in the second image, and the second region comprises an image of the eye including a sclera and a pupil; and the second illumination position is selected such that the specular image is substantially coincident with one or more of the sclera, or the pupil. Effectively, the position of the specular image may be shifted from the iris to the sclera or pupil region by illuminating the spectacle-wearing user's eye from the second illumination position.

Preferably, the second illumination position is selected such that the second region is located in a plane incongruent with the image capture plane, such that the specular image is not located in the second image. In this way, the image capture device captures a clear image of the eye comprising the iris, pupil and sclera.

Alternatively, the system may comprise illumination position varying means arranged to vary the position of the illumination source relative to the user's eye or the image capture device.

The illumination source may comprise a plurality of light sources located at different positions relative to the user or the image capture device, and the illumination position varying means is arranged to vary the position of the illumination source by activating a different one of the plurality of light sources.

Preferably, each one of the plurality of light sources is associated with either the first illumination position or with the second illumination position, the illumination position varying means is operatively coupled to the determining means, and the position varying means is arranged to activate a light source associated with the second illumination position when the determining means determines that a specular image is located in the first region of interest. In this way the process of switching illumination positions may be automated subject to a specular image being identified in the first region of interest. For example, this might comprise the determining means sending a control signal to the illumination position varying means to switch the active illumination source, from a source located at a first illumination position to a source located at a second illumination position when a specular image is identified in the first captured image. In other words, the determining means can send a control signal to the illumination position varying means to change illumination position where a spectacle-wearing user is identified by the presence of a specular image in the first captured image.

In preferred embodiments, each one of the plurality of light sources is mounted on an angled support block. The angled support block may comprise: a first support surface comprising one or more light sources associated with the first illumination position; and a second support surface comprising one or more light sources associated with the second illumination position. The block may be arranged such that light emitted from a light source comprised on the first support surface forms an acute angle with light emitted from a light source comprised on the second surface. By acute is intended an angle less than 90°. The support block enables the light sources to emit light at the required angles, enabling the specular image to be shifted from the region of interest to the second region.

In alternative embodiments, the system may comprise image capture position varying means arranged to vary the position of the image capture device relative to one of the user's eye or the illumination source.

Preferably, image capture position varying means is arranged to vary the position of the image capture device from a first position associated with the first illumination position to a second position associated with the second illumination position. In this way, the system is to achieve the desired effect of shifting the specular image from the first region of interest to the second region.

Preferably, the first illumination means is arranged to emit light, which is incident on a lens surface of the user's spectacle at an acute angle of incidence measured with respect to a normal to the surface. By acute is intended less than 90°.

Alternatively, the first illumination means may be arranged to emit light which is incident on the lens surface at an angle of incidence substantially normal to the lens surface.

Alternatively, the first illumination means may be arranged to emit light which is incident on the lens surface at an angle of incidence comprised within the range $0° \leq \theta \leq 20°$ measured with respect to the normal to the surface.

Alternatively, the first illumination means may be arranged to emit light which is incident on the lens surface at an angle of incidence of substantially 12° measured with respect to the normal to the lens surface.

In preferred embodiments of the system, the second illumination means may be configured to emit light incident on a lens surface of the user's spectacle at an acute angle of incidence measured with respect to a normal to the surface. By acute is intended less than 90°.

Alternatively, the second illumination means may be configured to emit light incident on the lens surface at an angle of incidence $\theta$ comprised within the range $21° \leq \theta \leq 40°$ measured with respect to a normal to the lens surface.

Alternatively, the second illumination means may be configured to emit light incident on the lens surface at an angle of incidence of substantially 22° measured with respect to the normal to the lens surface.

A third aspect of the invention concerns an illumination support block for use in an iris recognition identification system. The illumination support block comprises: a first portion comprising one or more light sources associated with a first illumination position; a second portion comprising one or more light sources associated with a second illumination position; and wherein the block is arranged such that light emitted from a light source associated with the first portion forms an acute angle with respect to light emitted from a light source associated with the second portion. When affixed to an iris recognition identification system, the illumination support block provides an illumination source associated with a first illumination position as described afore, and an illumination source associated with a second illumination positions as described afore. In this way, a conventional iris recognition identification system may be adapted to captured specularity free images of a spectacle-wearing user's iris.

In preferred embodiments of the illumination block, the acute angle is substantially 10°.

In preferred embodiments of the illumination block, the first portion comprises a first surface arranged to receive the one or more light sources associated with the first illumination position; the second portion comprises a second surface arranged to receive the one or more light sources associated with the second illumination position; and wherein the first and second surface are in intersecting relation. Accordingly, light sources mounted on different surfaces of the block emit light at different angles. In this way, when affixed to an iris recognition identification system, the required angles of incidence may be obtained, to enable a specular image to be shifted from a first region of interest to a second region.

Preferably, the first and second surface form a relative angle of intersection, and wherein the angle of intersection is substantially 10°, such that light emitted from a light source associated with the first portion is divergent from light emitted from a light source associated with the second portion, by an angle of substantially 10°.

A further aspect of the present invention concerns an iris recognition identification system suitable for capturing an image of an iris free from specularities from a spectacle-wearing user. The system comprises: an image capture device for capturing one or more images of the spectacle-wearing user's eye; first illumination source for illuminating the spectacle-wearing user's eye from a first illumination position associated with a first optical path; a processor for determining if a first captured image illuminated from the first illumination position, comprises a specular image located in a first region of interest, the specular image being formed by light reflected from the spectacles; second illumination source for illuminating the spectacle-wearing user's eye from a second illumination position; and wherein the second illumination position is associated with a second optical path different to the first optical path such that the location of the specular image is shifted to a second region when the second illumination source is active. The presence of the second illumination means associated with a second optical path, enables the position of the specular image to be shifted away from the region of interest, such that a clear image of the spectacle-wearing user's eye may be captured without requiring the user remove the spectacles.

The present invention provides a solution to the problem of capturing specularity free images of a spectacle-wearing user's iris which may be implemented in either manned or unmanned applications.

BRIEF DESCRIPTION OF THE DRAWINGS

FIGS. 1a and 1b are schematic plan views of the two different modes of operation of an iris recognition identification system in accordance with an embodiment of the present invention, where FIG. 1a illustrates a direct illumination mode of operation, and FIG. 1b illustrates a crossed illumination mode of operation;

FIG. 4a is a perspective view of the top face of the support block, and FIG. 4b is a side view of the support block.

DETAILED DESCRIPTION

Figure 2:
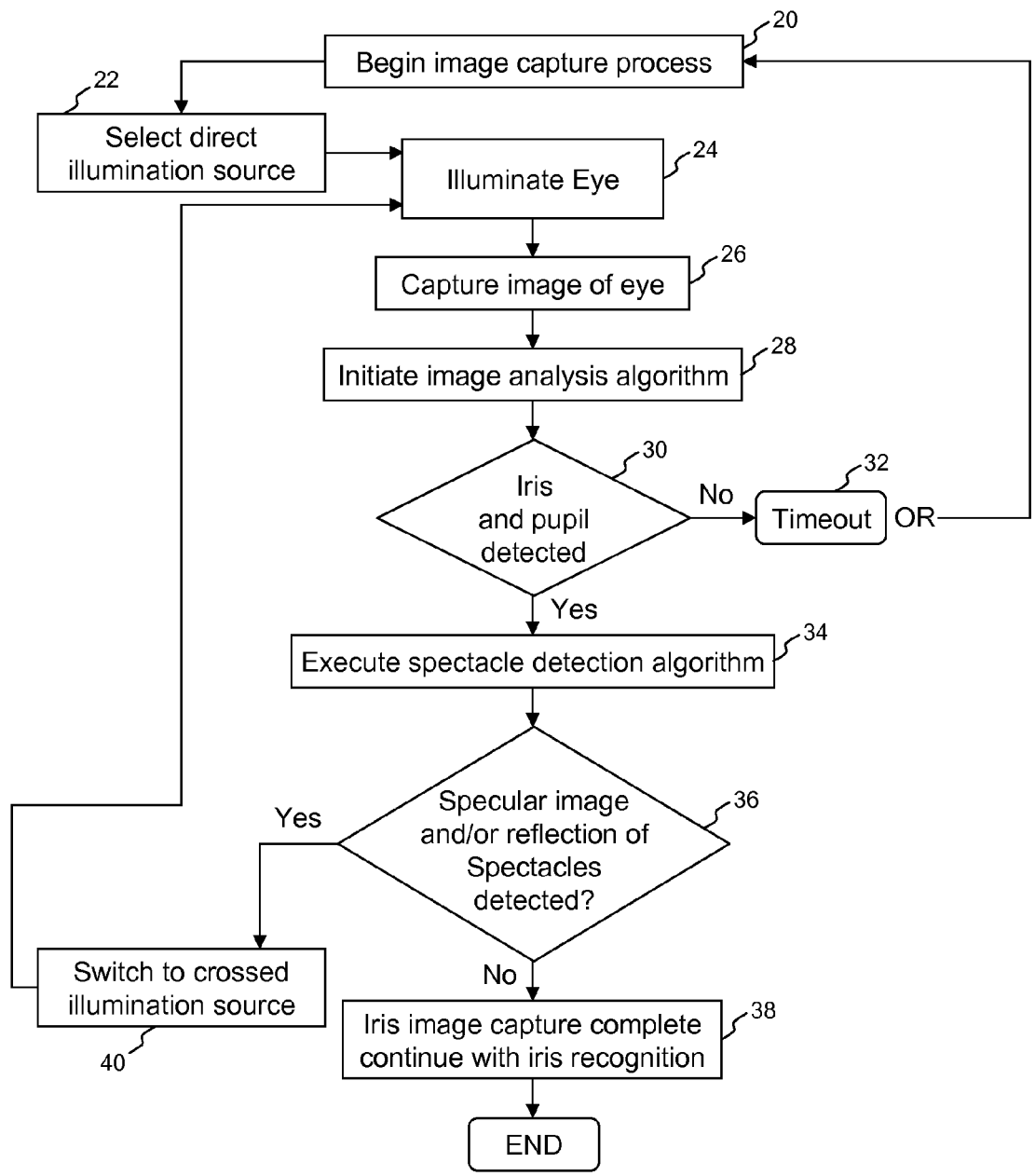
FIG. 2 is a process flow chart outlining a method for detecting if a user is wearing spectacles using the system illustrated in FIGS. 1a and 1b.

Preferred embodiments of the present invention are now described with reference to the appended figures. Like reference numerals will be used in different Figures to refer to the same apparatus.

FIG. 1a illustrates an iris recognition identification system 1 in accordance with an embodiment of the present invention. The system 1 is illustrated illuminating the eyes 3a, 3b of a user 5 wearing spectacles 7—henceforth referred to as a "spectacle-wearing user"—in a first mode of operation, referred to as "direct illumination." One or more images of the eyes 3a, 3b are captured.

To capture an image of a user's eyes 3a, 3b, it is necessary to illuminate the eyes 3a, 3b and to image the light reflected from them, using one or more image capture devices. Such one or more image capture devices may relate to cameras 9a, 9b. By camera is intended either a camera arranged to capture still images, or a video camera which is arranged to capture a sequence of still images in short temporal succession so as to provide the impression of a moving image.

Where the user is wearing spectacles, as mentioned in the background section, a portion of the light incident on the spectacles 7 is reflected by the optical lenses 7a of the spectacles 7, and is incident on the cameras 9a, 9b where it is imaged. This portion of reflected light appears as a specular reflection/specularity in the captured image. Similarly, a portion of the light incident on the optical lenses 7a is transmitted through the lenses and is incident on the eyes 3a, 3b. This incident light is subsequently reflected from the surface of the eyes 3a, 3b back through the spectacles 7, and is incident on the cameras 9a, 9b, where it is imaged. In this way an image of both the eyes 3a, 3b and the specular reflection is captured by cameras 9a, 9b. Where the positions of the two images are substantially coincident in the image plane, this may result in a loss of clarity in the captured image of the eyes 3a, 3b. For example, this loss of clarity may occur in the iris portion of the captured image of the eyes 3a, 3b, and as a consequence may detrimentally impact the accuracy of the iris recognition identification system, and specifically may decrease the accuracy of the iris biometric identification process.

To capture a clear image of the iris, it is necessary to minimise the amount of light reflected from the optical lenses 7a of the spectacles 7 imaged at positions in the image plane (i.e. the camera sensor) that are substantially coincident with the position of the iris image.

In the apparatus of FIG. 1a, two cameras 9a, 9b are used to image the eyes 3a, 3b of the spectacle-wearing user 5. Each one of the cameras 9a, 9b images a different one of the spectacle-wearing user's eyes 3a, 3b. For example, the camera 9a located on the left-hand side of the iris recognition identification system 1, captures an image of the user's right eye 3a, where the right eye 3a is in opposing relation to the camera 9a (i.e. it lies opposite the camera 9a) and is facing the camera 9a. Similarly, the camera 9b located on the right-hand side of the iris recognition identification system 1, captures an image of the user's left eye 3b, which eye is in opposing relation to the camera 9b and faces the camera 9b.

The illumination source is provided by a plurality of light sources 11a, 11b, 11c, 11d. In preferred embodiments these light sources relate to light emitting diodes (LEDs). Alternative light sources may equally be used in place of LEDs. Preferably, the LEDs operate in the near infrared spectrum. However, alternative embodiments are envisaged in which the LEDs operate in different regions of the electromagnetic spectrum, such as in the visible spectrum. Such embodiments are within the scope of the present invention.

The plurality of light sources are located at different positions relative to the spectacle-wearing user's eyes 3a, 3b, the spectacles 7, and the cameras 9a, 9b. In the illustrated direct illumination mode of operation, light sources 11a and 11b are active. Light emitted from these two sources is incident on the optical lenses 7a of the spectacles 7, at an acute angle measured with respect to the normal of the optical lenses 7a. The acute angle may relate to an angle substantially normal to the surface. Alternatively, the angle of incidence may be comprised within the range 0° to 20° as measured with respect to the normal. It should be noted that FIG. 1a is not drawn to scale and grossly exaggerates the angle of incidence of light incident on the spectacles 7.

Described in terms of optical paths, light emitted from a light source 11a and incident on the camera 9a follows a first optical path. The first optical path comprises a first component path A-B, which is the path of light emitted from light source 11a and incident on the spectacle-wearing user (i.e. direct illumination mode of operation). Light reflected from the spectacles 7 and/or user eye 3a, follows a second component path B-C, at the end of which the reflect light is captured by the camera 9a. Similarly, light emitted from a light source 11b traverses a second optical path comprising a first component D-B, and a second component B-C, at the end of which it is captured by the camera 9a. The second optical, which may be denoted D-B-C is associated with a "crossed illumination" mode of operation, a preferred embodiment of which is illustrated in FIG. 1b and discussed in further detail below. Clearly, the first optical path and the second optical path respectively associated with light emitted from a different light source are different.

The direct illumination mode of operation is unsuitable for capturing clear images of a spectacle-wearing user's eyes 3a, 3b, for the aforementioned reasons (i.e. due to the formation of specular reflections in the one or more captured images arising from incident light reflected from the spectacles 7, that is captured by the cameras 9a, 9b).

To resolve this problem of specular image capture, the iris recognition identification system 1 comprises a second illumination mode of operation referred to above as "crossed illumination," and which is illustrated in FIG. 1b. In this mode of operation light sources 11b, 11c located at different positions with respect to the first activated light sources 11a, 11d are activated to illuminate the spectacle-wearing user's eyes 3a, 3b. Furthermore, the light emitted from the active light sources 11b, 11c follows a different optical path with respect to the optical path followed by light emitted from light sources 11a, 11d. Light emitted from the active light sources 11b, 11c is incident on the spectacles at wider angles than light emitted from the previously active light sources 11a, 11d. For example, in preferred embodiments the angle of incidence may be comprised within the range 21° to 40° as measured with respect to the normal to the surface of the optical lenses 7a of the spectacles 7. At such wider angles of incidence, a greater portion of the incident light is reflected from the surface of the optical lenses 7a. This results in a decrease in the intensity of light that is transmitted through the spectacles and reflected by the eyes 3a, 3b.

The skilled reader will appreciate that the portion of light reflected and transmitted at any boundary between two media having different refractive indices (such as at the air-lens boundary) is described mathematically by the Fresnel equations. For a more thorough discussion of the Fresnel equations, the interested reader is referred to any University level textbook on optics, such E. Hecht, "Optics", ©Pearson Education Inc., publishing as Addison Wesley, ISBN 0-321-18878-0.

To compensate for this loss of intensity, the intensity of the light emitted by the wide angle light sources 11b, 11c may be increased, to ensure that the intensity of the light transmitted through the optical lenses 7a and reflected from the eyes 3a, 3b back to the cameras 9a, 9b, is of sufficient intensity to provide a clear image of the eyes 3a, 3b, and specifically of the irides.

In the crossed illumination mode of operation, and as illustrated in FIG. 1b, light emitted from the left-hand light source 11b, is used to illuminate the spectacle-wearing user's left eye 3b. Similarly, the spectacle-wearing user's right eye 3a is illuminated by light emitted from the right-hand light source 11c. In this illumination mode, each illumination source 11b, 11c illuminates the eye which lies in a crossed relation with respect to its position.

The skilled reader will appreciate, and in accordance with Snell's law of reflection (the interested reader is referred to any University level textbook on optics for a detailed discussion of Snell's law), light incident on the surface of the optical lenses 7a of the spectacles 7 will be reflected at an angle equal to the angle of incidence. One effect of using the light sources 11b, 11c associated with wider angles of incidence to illuminate the eyes 3a, 3b of the spectacle-wearing user, (and since the cameras 9a, 9b are maintained in fixed relation with respect to the user's eyes 3a, 3b) is that the light reflected from the spectacles 7 is not imaged by the cameras 9a, 9b, provided that the angle of incidence, and by association the angle of reflection is sufficiently large to ensure that the reflected light is not captured by the cameras 9a, 9b. Thus, by varying the angle of incidence of light incident on the optical lenses 7a of the spectacles 7, which may be achieved by varying the optical path of the illuminating light, the position of where the specular images form, may be varied. Where the angle of incidence is sufficiently large, the position where the specular images are formed may be entirely shifted away from the image capture plane of the cameras 9a, 9b. This effect may be achieved by switching from the direct illumination mode of operation illustrated in FIG. 1a, to the crossed illumination mode of operation illustrated in FIG. 1b. In effect, the position of the active illumination source is shifted from a first position (associated with the position of the light sources 11a, and 11d) to a second position (associated with the position of the light sources 11b, 11c). This shift in illumination position is associated with a shift in optical path, namely from the aforementioned first optical path to the second optical path. In this way, the formation of specular images resulting from light reflected by the spectacles 7 in the captured image is reduced, and a clearer image of the eyes 3a, 3b is obtained.

One advantage associated with the present embodiment is that no moving parts are required in the iris recognition identification system 1 to alternate between the direct and crossed illumination modes of operation. This simplifies the construction of the system 1, and reduces the sources of mechanical failure.

However, it is equally possible to achieve the same effect as achieved by the crossed illumination mode of operation—namely, increasing the angle of incidence of light incident on the optical lenses 7a of the spectacles 7—by using position-variable light sources. For example, this may be achieved by simply varying the position of the light source relative to the positions of the spectacle-wearing user, and the cameras. In other words, rather than activating a different light source having a different position relative to the spectacles and the cameras, the light source is simply moved to a different position where emitted light is incident on the lenses at a greater angle of incidence. The skilled reader will appreciate that this also corresponds to a variation of the optical path, since the relative distance between the light source and the spectacles is varied.

In a multi-eye iris recognition identification system, where images of both spectacle-wearing user's eyes are captured, two movable light sources may be used. Each light source may be used to illuminate a different user eye. Such movable light sources may relate to light sources mounted on a guide rail or such like, and powered by an electric motor or similar device, enabling the position of the light source to be varied along the guide rail.

Another way to achieve the same effect as achieved by the crossed illumination mode of operation is to vary the position of the image capture devices (i.e. the cameras) with respect to the position of the spectacle-wearing user, and the active illumination source. Again, the skilled reader will note that this also corresponds to a variation of the optical path, since the relative distance between the spectacles and the image capture devices is varied. In such alternative embodiments, the position of the illumination source may be in fixed relation with respect to the position of the spectacle-wearing user. The positions of the cameras may be varied to positions where the light reflected from the optical lenses of the spectacles is not incident on the cameras, and accordingly is not imaged. For example, with reference to FIG. 1a, this may comprise moving the position of the camera 9a towards the right, and camera 9b towards the left. The cameras may be mounted on a guide rail or such like, and movement of the camera thereon may be varied by an electric motor or similar device.

A further way to achieve the same effect as achieved by the crossed illumination mode of operation is to vary the position of the user's eyes with respect to the one or more active illumination sources and the cameras. The skilled reader will appreciate that this variation of the position of the user's eyes is associated with a variation in optical path. For example, to reduce the capture of specular reflections due to incident light being reflected from the optical lenses of the spectacles, the user may vary their current position to a second position, where incident light is reflected from the optical lenses of the spectacles at an angle such that it is not captured by the cameras. In such an embodiment the cameras may be in fixed relation with respect to the illumination sources, and only the position of the user is varied with respect to both.

Variation of the optical path, by varying the relative position between any one of the illumination sources, the user's eyes, or the image capture devices, may be used to solve the problem of specular image capture, which reduces image clarity in iris recognition identification systems.

FIG. 2 illustrates a process flow chart of a method for determining which one of the two illumination modes illustrated in respectively FIGS. 1a and 1b is to be implemented, to mitigate for unwanted specular images forming in the image capture plane, resulting from light reflected from a user's spectacles. It is envisaged that the present method may be used in both manned and unmanned applications of iris recognition identification systems. Although not illustrated in FIGS. 1a and 1b, the iris recognition identification system 1 comprises processing means, preferably local to the identification system. Although, embodiments where the processing means are located remote to the iris recognition identification system 1 are also envisaged, in which case the system may be operatively connected to a remotely located processing means (e.g. a remotely located computer in operative communication with the system 1).

Local processing means may relate to one or more processing units arranged to carry out image analysis of the captured images of the spectacle-wearing user's eyes. Incidentally, these processing means may relate to the same processing means which are used to carry out the iris verification step in the biometric identification process, where the identity of the user is determined from an analysis of the captured iris image. The image analysis capabilities may be provided by image analysis software executed by the one or more processing units.

The present method may be thought of as effectively comprising of two different stages. In the first stage, it is determined if the user is wearing spectacles. If spectacles are detected, then in the second stage the method requires the iris recognition identification system 1 to automatically switch to the crossed illumination mode of operation (illustrated in FIG. 1b). The following description of the present method will be described with reference to an image of a user's right eye 3a being captured by the iris recognition identification system 1 of FIGS. 1a and 1b. It is to be appreciated however, that the present method may equally be used in conjunction with the iris recognition identification system of FIGS. 1a and 1b, wherein both user's eyes 3a, 3b are imaged simultaneously, or sequentially.

The present method may be incorporated into the iris image acquisition process which is a carried out by all iris recognition identification systems, including the systems of FIGS. 1a and 1b. The present method is initiated at step 20 when the image capture process is initiated by a user wishing to carry out an iris identification process by presenting themselves before the iris recognition identification system 1, and specifically before the cameras 9a, 9b. By default the system 1 switches to a direct illumination mode of operation (illustrated in FIG. 1a) at step 22. The right eye 3a of the user is illuminated by the active direct illumination source 11a at step 24. An image of the eye is captured at step 26 by the camera 9a, by imaging the reflected light as described previously in relation to FIG. 1a. An image analysis algorithm is initiated and executed by the one or more local processing units configured with image analysis software, at step 28. The object of the image analysis process is to determine if the captured image of the user's eye comprises a clear image of the iris, which may be used for subsequent biometric identification purposes.

At step 30, the image analysis algorithm determines if an iris and pupil is detected in the captured image. This may comprise executing a pupil and iris localisation algorithm to locate the image of the pupil and the iris from the captured image. This may be referred to as pupil/iris localisation. Since such image analysis algorithms are known in the art, and they are outside the scope of the present invention, no further discussion thereof will ensue. Instead, the interested reader is referred to U.S. Pat. No. 5,291,560 (Daugman) which describes one way of carrying out pupil/iris localisation. Similarly, the article titled "How Iris Recognition Works" by John Daugman, published in IEEE Transactions on Circuits and Systems for Video Technology, Volume 14, No. 1, January 2004 also describes a method for carrying out pupil/iris localisation.

If an iris and/or pupil cannot be localised within the captured image, then the present method either times out at step 32, or the image capture process is initiated again and steps 20 through 30 are repeated until an iris and/or pupil can be localised within the captured image.

Once an iris and/or pupil are localised in the captured image, a spectacle detection algorithm is initiated at step 34. The objective of this algorithm is to determine at step 36 if a specular image/reflection is present in the iris image, which reduces the effective clarity of the iris image. This step may be carried out by the one or more local processing units configured with image analysis software. For example, this step may comprise analysing the pixels of the iris image for any hotspots. By hotspots is intended any one or more pixels whose brightness is significantly greater than the brightness of its neighbouring pixels. Such pixels may be identified by determining the intensity differential between neighbouring pixels. Some gradual variation of the intensity across the iris is expected however, any large fluctuations of intensity are likely to be indicative of the presence of specularities in the iris image.

If no specular images/reflections are detected in the iris image at step 36, then the present method is complete, the iris image does not comprise any specularities, and the iris recognition identification system 1 may continue with the biometric identification process, in step 38.

In contrast if a specular reflection is detected in the iris image, the one or more local processing units switch from a direct illumination mode of operation to the crossed illumination mode of operation (illustrated in FIG. 1b) at step 40. Steps 24 through 36 are repeated with the iris recognition identification system operating in the crossed illumination mode of operation, until both an iris and/or pupil are localised within the captured image, and no specularities are identified in the iris image. Only once a clear image of the user's iris has been captured can the iris recognition identification system proceed with biometric identification (i.e. iris recognition and validation).

In some embodiments of the present method, once the switched illumination mode of operation has been activated and an image of the eye 3a captured, the spectacle detection algorithm is bypassed, to avoid needless computational repetition. The system 1 proceeds with carrying out biometric identification on the basis of the captured iris image. With reference to FIG. 2, this effectively means bypassing steps 34 to 36 and proceeding with step 38.

Figure 3:
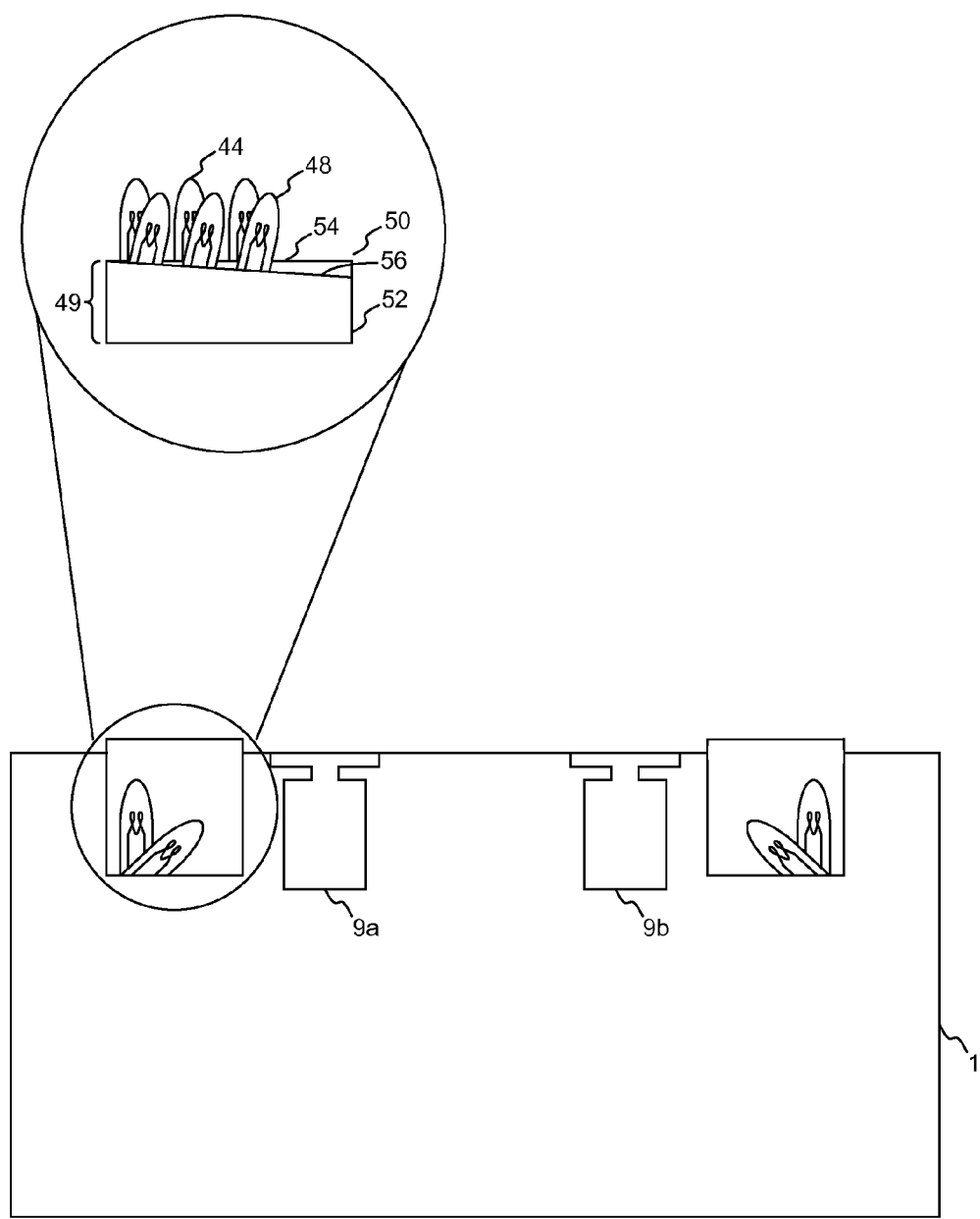
FIG. 3 is a schematic plan view of the light source of the system illustrated in FIGS. 1a and 1b, mounted on an angled support block.

FIG. 3 illustrates an example of how the LED illumination sources illustrated in FIGS. 1a and 1b, may be arranged in an iris recognition identification system in accordance with preferred embodiments. FIG. 3 illustrates a detailed blown-up view of the left-hand illumination sources 11a, 11b of FIGS. 1a and 1b, which are labelled 44, 48. The LEDs 44, 48 are mounted on an angled support block 49, which may comprise a first portion 50 and a second portion 52. The first and second portions 50, 52, may be rectangular shaped. Both portions comprise respectively support surfaces 54, 56, arranged to receive one or more LEDs 44, 48. The support surfaces 54, 56 are angled at different angles with respect to each other. In other words, support surface 54 is comprised in a first plane, and support surface 56 is comprised in a second plane, and the first and second planes are in intersecting relation. In the direct illumination mode of operation LEDs 44 mounted on the first portion 50 are activated, whilst in the crossed illumination mode of operation LEDs 48 mounted on the second portion 52 are activated.

Figure 4A:
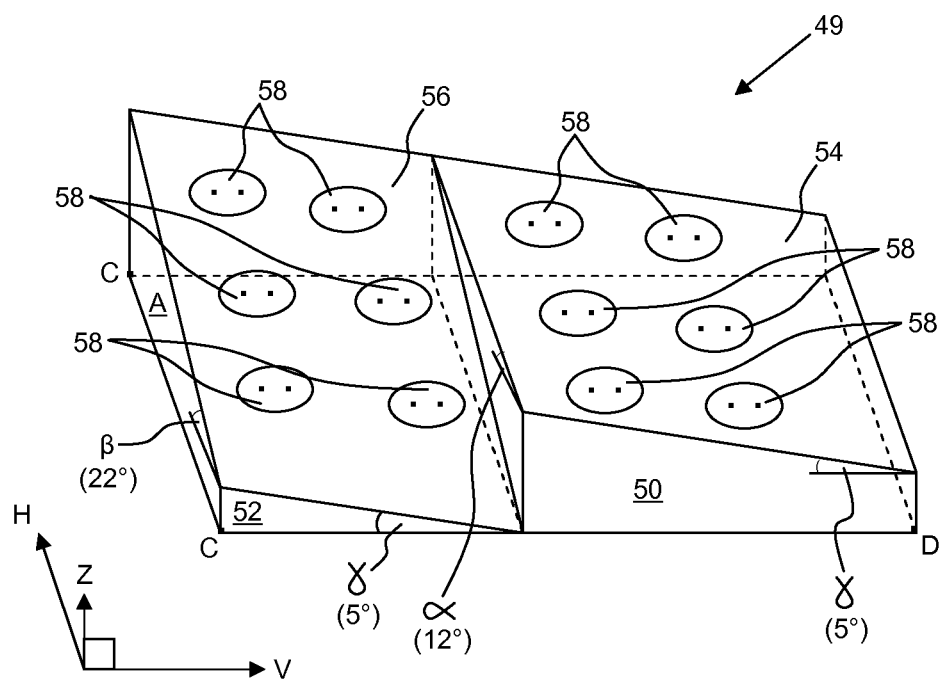
FIGS. 4a and 4b are different perspective views of the angled support block of FIG. 3, specifically.
Figure 4B:
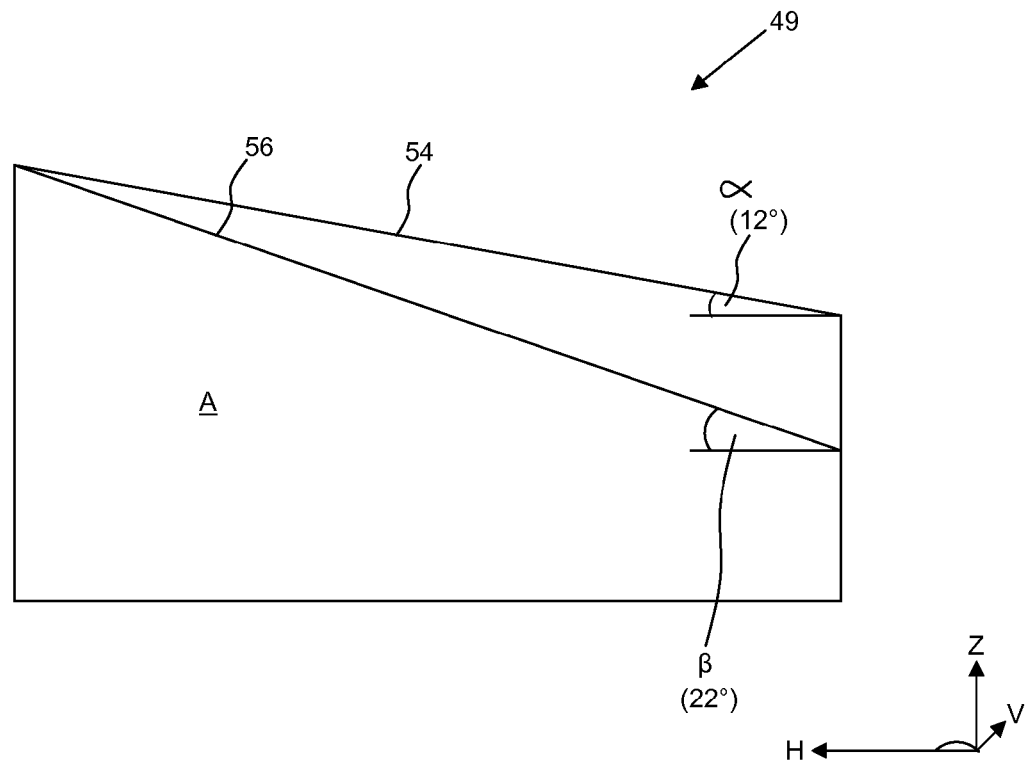

FIGS. 4a and 4b illustrate two different perspective views of the support block 49. For clarity, the LEDs 44, 48 have been omitted. FIG. 4a illustrates a perspective view of the top face of the support block 49, and clearly shows the angled relation between the two support surfaces 54, 56. The support surface 54 associated with the first portion 50 forms an angle α with the indicated horizontal axis. In preferred embodiments α is 12°. In other words, in preferred embodiments, the support surface 54 associated with the first portion 50 of the support block 49, is angled at 12° with respect to the horizontal axis. In the present discussion, the horizontal axis is taken to be parallel to the line segment marked C-C in FIG. 4a, whereas the vertical axis is taken to be parallel to the line segment marked C-D. The support surface 56 associated with the second portion 52 forms an angle β with the horizontal axis. In preferred embodiments β is 22°. In other words, in preferred embodiments, the support surface 56 associated with the second portion 52 of the support block 49, is angled at 22° with respect to the horizontal axis. The support surfaces 54, 56 are populated with receiving means 58 arranged to receive an illumination source such as the LEDs 44, 48 of FIG. 3. In preferred embodiments, the receiving means may relate to a plurality of sockets.

The relative angled relation of the support surfaces 54, 56 is more readily seen in FIG. 4b which is a side view of face A of the support block 49. FIG. 4b readily shows the angles α and β formed with respect to the horizontal axis, associated respectively with support surfaces 54 and 56.

Returning to FIG. 4a, both support surfaces 54, 56 form an angle γ with respect to the vertical axis. In preferred embodiments γ is 5°. In other words, both support surfaces 54, 56 associated with respectively the first and second portions 50, 52 of the support structure 49 are angled at 5° with respect to the illustrated vertical axis. In this way, the iris recognition identification system is able to achieve the required angles of incidence when operating in both the direct illumination mode of operation (shown in FIG. 1a) and the crossed illumination mode of operation (shown in FIG. 1b).

The skilled reader will appreciate that one effect of increasing the angle of incidence of light illuminating the user's eyes 3a, 3b is that a portion of the incident light may be internally reflected along at least a portion of the width of the eye. Due to the curvature of the surface of the eyes 3a, 3b, this internally reflected light tends to exit the eye at positions within the sclera region of the eye. Upon exiting the eyes 3a, 3b, this internally reflected light can form unwanted specular artifacts at the exit position. Such artifacts appear as specular images in the captured image of the eye. These specular images are to be distinguished from the specular images arising due to reflection of incident light from the user's spectacles 7. In particular, such artifacts are not of concern, since they form in the sclera region of the eye, and do not adversely affect iris image clarity.

Further Embodiments

It is to be appreciated that the present invention can work equally well in conjunction with iris recognition identification system which image both users' eyes, or a single eye. It is to be understood that any herein described embodiment described with respect to an iris recognition identification system imaging both eyes, is equally well applicable in an iris recognition identification system imaging only a single eye. It is also to be appreciated that such alternatives fall within the scope of the present invention. Whether an iris recognition identification system images a single eye or both user's eyes, will depend on the level of security required for the given application.

It is to be appreciated that whilst the embodiments discussed herein have provided solutions to the problem of specular image capture as effectively shifting the entire position of specular image formation away from the image plane of the image capture device, this is not necessary in all embodiments of the present invention. To ensure that a clear image of the iris is captured it is merely necessary that the position of any specular reflections is shifted away from the position of the iris image. Accordingly, for biometric iris identification purposes, shifting the position of the specular reflection to the sclera (i.e. the white of the eye) is an equally viable solution, and such embodiments fall within the scope of the present invention. On this basis, it is envisaged that alternative angles of incidence may be provided that satisfy the requirements of the present invention and such embodiments fall within the scope of the present invention.

Similarly, alternative embodiments are envisaged where the position of the specular image may be shifted to a position substantially coincident with the pupil image position.

The herein described embodiments are for illustrative purposes only and are not limiting to the present invention.

What is claimed is:

1. A method of capturing an image of an iris free of specularities from a spectacle-wearing user, for use in an iris recognition identification system, which includes an illumination source and an image capture device, the method comprising the steps of:
    illuminating an eye of the user from a first illumination position associated with a first optical path, and capturing a first image of the eye;
    determining if the first image comprises a specular image in a first region of interest, the first region of interest comprising an image of the iris, the specular image being formed by light reflected from the spectacles, the determining step comprising analyzing the first image to identify if the location of the specular image is at least partly coincidence with the iris image;
    illuminating, in response to a presence of a specular image, the eye from a second illumination position associated with a second optical path different to the first optical path, such that the specular image is shifted to a second region, the second region being coincident with at least one of an image of a sclera of the eye and an image of a pupil of the eye; and
    capturing a second image of the eye with the specular image located at the second region.

2. The method of claim 1, wherein the second region is comprised in the second image.

3. The method of claim 1, further comprising switching from the first illumination position to the second illumination position by at least one of varying the optical path between the illumination source and the eye of the user, and varying the optical path between eye of the user and the image capture device.

4. The method of claim 3, comprising varying the relative position of the illumination source with respect to the eye of the user such that the optical path between the illumination source and the eye of the user is varied.

5. The method of claim 3, comprising varying the relative position of the image capture device with respect to the eye of the user such that the optical path between the image capture device and the eye of the user is varied.

6. The method of claim 4, wherein the illumination source comprises a plurality of light sources located at different positions with respect to the eye of the user, and the optical path is varied by activating a different one of the plurality of light sources.

7. The method of claim 6, wherein each one of the light sources is associated with either the first illumination position or with the second illumination position, and the optical path is varied in the switching step by activating a light source associated with the second illumination position.

8. The method of claim 7, wherein each one of the light sources is mounted on an angled support block, the block comprising:
    a first portion defining a support surface comprising one or more light sources associated with the first illumination position; and
    a second portion defining a support surface comprising one or more light sources associated with the second illumination position, the block being arranged such that light emitted from a light source comprised on the first portion forms an acute angle with light emitted from a light source comprised on the second portion.

9. The method of claim 4, wherein the illumination source comprises a position-variable light source, and the varying step comprises varying the position of the light source from the first illumination position to the second illumination position.

10. The method of claim 3, wherein the optical path is varied by varying the position of the user with respect to the illumination source or the image capture device.

11. The method of claim 3, wherein the optical path is varied by varying the position of the image capture device with respect to the eye of the user or the illumination source.

12. The method of claim 1, wherein the spectacle comprises an optical lens including a portion defining a lens surface, and light emitted during the illuminating step from the illumination source is incident on the lens at an angle of incidence.

13. The method of claim 12, wherein the angle of incidence of light emitted from the illumination source associated with the first illumination position is acute.

14. The method of claim 13, wherein the angle of incidence is substantially normal to the lens surface.

15. The method of claim 13, wherein the angle of incidence θ is comprised within the range $0°≤θ≤20°$ measured with respect to a normal to the lens surface.

16. The method of claim 15, wherein the angle of incidence is substantially 12° measured with respect to the normal to the lens surface.

17. The method of claim 12, wherein the angle of incidence of light emitted from the illumination source associated with the second illumination position, is acute.

18. The method of claim 17, wherein the angle of incidence θ is comprised within the range $21°≤θ≤40°$ measured with respect to a normal to the lens surface.

19. The method of claim 18, wherein the angle of incidence is substantially 22° measured with respect to the normal to the lens surface.

20. An iris recognition identification system suitable for capturing an image of an iris free from specularities from a spectacle-wearing user, the system comprising:
    an image capture device for capturing one or more images of the spectacle-wearing user's eye;
    a first illumination device for illuminating the spectacle-wearing user's eye from a first illumination position associated with a first optical path;
    a determining module for determining if a first captured image illuminated from the first illumination position, comprises a specular image located in a first region of interest, the first image of interest comprising an image of the iris, the specular image being formed by light reflected from the spectacles, the determining module being configured to analyze the first image to identify if the location of the specular image is at least partly coincident with the iris image;

a second illumination device for illuminating the spectacle-wearing user's eye from a second illumination position; and wherein the second illumination position is associated with a second optical path different to the first optical path such that the location of the specular image is shifted to a second region in a second captured image when the second illumination device is active, the second region being coincident with at least one of an image of a sclera of the spectacle wearing user's eye and an image of a pupil of the spectacle wearing user's eye in the second captured image.

21. The system of claim 20, wherein the determining module comprises a processor configured with image analysis software for analyzing the first captured image.

22. The system of claim 20, wherein the image capture device defines an image capture plane, and the image capture device is arranged to capture a second image of the spectacle-wearing user's eye when the eye is illuminated from the second illumination position.

23. The system of claim 2, comprising an illumination position varying device arranged to vary the position of the illumination source relative to the spectacle-wearing user's eye or the image capture device.

24. The system of claim 23, wherein the illumination source comprises a plurality of light sources located at different positions relative to the user or the image capture device, and the illumination position varying device is arranged to vary the position of the illumination source by activating a different one of the plurality of light sources.

25. The system of claim 24, wherein each one of the plurality of light sources is associated with at least one of the first illumination position and with the second illumination position, the illumination position varying device is operatively coupled to the determining module, and the position varying device is arranged to activate a light source associated with the second illumination position when the determining module determines that a specular image is located in the first region of interest.

26. The system of claim 25, wherein each one of the plurality of light sources is mounted on an angled support block comprising:

a first support portion defining a surface comprising one or more light sources associated with the first illumination position; and a second support portion defining a surface comprising one or more light sources associated with the second illumination position, the block being arranged such that light emitted from a light source comprised on the first support portion forms an acute angle with light emitted from a light source comprised on the second portion.

27. The system of claim 2, comprising image capture position varying device arranged to vary the position of the image capture device relative to one of the spectacle-wearing user's eye or the illumination source.

28. The system of claim 27, wherein the image capture position varying device is arranged to vary the position of the image capture device from a first position associated with the first illumination position to a second position associated with the second illumination position.

29. The system of claim 20, wherein the first illumination device is arranged to emit light, which is incident on a portion defining a lens surface of the user's spectacle at an acute angle of incidence measured with respect to a normal to the lens surface.

30. The system of claim 29, wherein the angle of incidence is substantially normal to the lens surface.

31. The system of claim 29, wherein the angle of incidence θ is comprised within the range 0°≤θ≤20° measured with respect to the normal to the surface.

32. The system of claim 31, wherein the angle of incidence is substantially 12° measured with respect to the normal to the lens surface.

33. The system of claim 20, wherein the second illumination means device is configured to emit light incidence on a lens surface of the user's spectacle at an acute angle of incidence measured with respect to a normal to the surface.

34. The system of claim 33, wherein the angle of incidence θ is comprised within the range 21°≤θ≤40° measured with respect to a normal to the lens surface.

35. The system of claim 34, wherein the angle of incidence is substantially 22° measured with respect to the normal to the lens surface.

36. An illumination support block for use in an iris recognition identification system, comprising:

a first portion comprising one or more light sources associated with a first illumination position;

a second portion comprising one or more light sources associated with a second illumination position; and wherein the block is arranged such that in use light emitted from a light source associated with the first portion forms an acute angle with respect to light emitted from a light source associated with the second portion.

37. The support block of claim 36, wherein the acute angle is substantially 10°.

38. The support block of claim 36, wherein:

the first portion comprises a first sub portion defining a surface arranged to receive the one or more light sources associated with the first illumination position;

the second portion comprises a second sub portion defining a surface arranged to receive the one or more light sources associated with the second illumination position; and wherein the surfaces of the first and second sub portions are in intersecting relation.

39. The support block of claim 38, wherein the surfaces of the first and second sub portions form a relative angle of intersection.

40. The support block of claim 39, wherein the angle of intersection is substantially 10°, such that light emitted from a light source associated with the first portion is divergent from light emitted from a light source associated with the second portion, by an angle of substantially 10°.

41. An iris recognition identification system suitable for capturing an image of an iris free from specularities from a spectacle-wearing user, the system comprising:

an image capture device for capturing one or more images of the spectacle-wearing user's eye;

first illumination source for illuminating the spectacle-wearing user's eye from a first illumination position associated with a first optical path;

a processor for determining if a first captured image illuminated from the first illumination position, comprises a specular image located in a first region of interest, the specular image being formed by light reflected from the spectacles, the first region of interest comprising an image of the iris, and the processor being arranged to analyze the first image to identify if the location of the specular image is at least partly coincident with the iris image;

second illumination source for illuminating the spectacle-wearing user's eye from a second illumination position; and wherein the second illumination position is associated with a second optical path different to the first optical path such that the location of the specular image is shifted to a second region when the second illumination source is active, the second region being coincident with at least one of an image of a sclera of the spectacle-wearing user's eye and an image of a pupil of the spectacle-wearing user's eye.

42. A system of claim 41, including an illumination support block further comprising:
   a first portion comprising one or more light sources associated with a first illumination position;
   a second portion comprising one or more light sources associated with a second illumination position; and wherein
   the block is arranged such that in use light emitted from a light source associated with the first portion forms an acute angle with respect to light emitted from a light source associated with the second portion.

\* \* \* \* \*